US007366766B2

(12) United States Patent
Kroeker et al.

(10) Patent No.: US 7,366,766 B2
(45) Date of Patent: *Apr. 29, 2008

(54) WEB-BASED SPEECH RECOGNITION WITH SCRIPTING AND SEMANTIC OBJECTS

(75) Inventors: John Kroeker, Hamilton, MA (US); Oleg Boulanov, Beverly, MA (US)

(73) Assignee: Eliza Corporation, Beverly, MA (US)

( * ) Notice: Subject to any disclaimer, the term of this patent is extended or adjusted under 35 U.S.C. 154(b) by 216 days.

This patent is subject to a terminal disclaimer.

(21) Appl. No.: 09/815,726

(22) Filed: Mar. 23, 2001

(65) Prior Publication Data

US 2002/0002463 A1 Jan. 3, 2002

Related U.S. Application Data

(60) Provisional application No. 60/192,091, filed on Mar. 24, 2000, provisional application No. 60/191,915, filed on Mar. 24, 2000, provisional application No. 60/192,090, filed on Mar. 24, 2000, provisional application No. 60/192,076, filed on Mar. 24, 2000.

(51) Int. Cl.
*G06F 15/16* (2006.01)
(52) U.S. Cl. .................. 709/217; 709/218; 704/270
(58) Field of Classification Search ............. 704/260, 704/251, 246, 257, 258, 271, 275, 9, 270, 704/270.1; 709/217–219, 201–203; 719/310
See application file for complete search history.

(56) References Cited

U.S. PATENT DOCUMENTS 5,027,408 A     6/1991  Kroeker et al.
5,083,268 A     1/1992  Hemphill et al.
5,168,524 A    12/1992  Kroeker et al.
5,369,726 A    11/1994  Kroeker et al.
5,457,768 A    10/1995  Tsuboi et al.
5,642,519 A *   6/1997  Martin ......................... 704/9
5,647,002 A     7/1997  Brunson (Continued)

OTHER PUBLICATIONS

Ye-Yi Wang, et al., "A Connectionist Model For Dialog Processing", Speech Processing 2, VLS1, Underwater Signal Processing, Toronto, May 14-17, 1991, International Conference On Acoustics, Speech & Signal Processing; ICASSP, New York, IEEE, US vol. 2, Conf. 16, May 1991, pp. 785-788.

(Continued)

*Primary Examiner*—Nathan Flynn
*Assistant Examiner*—Mohammad Siddiqi
(74) *Attorney, Agent, or Firm*—McDermott Will & Emery LLP

(57) ABSTRACT

The present invention is a system and method for creating and implementing transactional speech applications (SAs) using Web technologies, without reliance on server-side standard or custom services. A transactional speech application may be any application that requires interpretation of speech in conjunction with a speech recognition (SR) system, such as, for example, consumer survey systems. A speech application in accordance with the present invention is represented within a Web page, as an application script that interprets semantic objects according to a context. Any commonly known scripting language can be used to write the application script, such as Jscript, PerlScript, and VBscript. The present invention is "Web-based" to the extent that it implements Web technologies, but it need not include or access the World Wide Web.

10 Claims, 3 Drawing Sheets

U.S. PATENT DOCUMENTS

| | | | |
|---|---|---|---|
| 5,659,542 A | | 8/1997 | Bell et al. |
| 5,687,212 A | | 11/1997 | Kinser, Jr. et al. |
| 5,687,384 A | | 11/1997 | Nagase |
| 5,729,656 A | | 3/1998 | Nahamoo et al. |
| 5,748,841 A | | 5/1998 | Morin et al. ............... 395/2.66 |
| 5,799,276 A | | 8/1998 | Komissarchik et al. |
| 5,819,220 A | | 10/1998 | Sarukkai et al. |
| 5,822,728 A | | 10/1998 | Applebaum et al. |
| 5,822,729 A | | 10/1998 | Glass et al. |
| 5,825,977 A | | 10/1998 | Morin et al. |
| 5,835,890 A | | 11/1998 | Matsui et al. |
| 5,844,392 A | * | 12/1998 | Peurach et al. ........ 318/568.17 |
| 5,864,614 A | | 1/1999 | Farris et al. |
| 5,983,190 A | * | 11/1999 | Trower et al. .............. 704/276 |
| 6,032,111 A | * | 2/2000 | Mohri ........................... 704/9 |
| 6,052,682 A | | 4/2000 | Miller et al. |
| 6,101,473 A | | 8/2000 | Scott et al. |
| 6,134,548 A | | 10/2000 | Gottsman et al. |
| 6,154,720 A | | 11/2000 | Onishi et al. |
| 6,167,235 A | * | 12/2000 | Sibecas et al. ............. 340/7.29 |
| 6,173,261 B1 | | 1/2001 | Arai et al. |
| 6,173,279 B1 | | 1/2001 | Levin et al. |
| 6,233,561 B1 | | 5/2001 | Junqua et al. |
| 6,369,821 B2 | * | 4/2002 | Merrill et al. .............. 345/473 |
| 6,377,928 B1 | * | 4/2002 | Saxena et al. .............. 704/275 |
| 6,400,806 B1 | * | 6/2002 | Uppaluru ................. 379/88.02 |
| 6,401,085 B1 | * | 6/2002 | Gershman et al. ............. 707/4 |
| 6,453,290 B1 | * | 9/2002 | Jochumson ................. 704/231 |
| 6,502,072 B2 | * | 12/2002 | Jiang et al. ................. 704/255 |
| 6,587,822 B2 | * | 7/2003 | Brown et al. ............... 704/275 |
| 6,604,075 B1 | * | 8/2003 | Brown et al. ............ 704/270.1 |
| 6,606,744 B1 | * | 8/2003 | Mikurak ..................... 717/174 |
| 6,665,640 B1 | * | 12/2003 | Bennett et al. ............. 704/257 |
| 6,778,970 B2 | * | 8/2004 | Au .............................. 706/55 |
| 6,895,084 B1 | * | 5/2005 | Saylor et al. ............ 379/88.22 |
| 7,050,977 B1 | * | 5/2006 | Bennett ................... 704/270.1 |

OTHER PUBLICATIONS

Supplementary European Search Report, Aug. 1, 2005, 2 pp.

Makhoul, J. and R. Schwartz, State of the art continuous speech recognition, Proc. Natl. Acad. Sci. USA, vol. 92, pp. 9956-9963, 1995.

Houlding, David, Voice XML and the Voice-Driven Internet, Dr. Dobb's Journal, Apr. 2001.

Atlas, L. et al., Quadratic Detectors for General Nonlinear Analysis of Speech, ICASSP, vol. 2, pp. 9-12, 1992.

Okawa, S. et al., Estimation of Statistical Phoneme Center Considering Phonemic Environments, ICSLP, vol. 2, pp. 1069-1072, 1996.

Weber, K., Multiple Timescale Feature Combination Towards Robust Speech Recognition, IDIAP Research Report, Dalle Molle Institute for Perceptual Artificial Intelligence, Valais, Switzerland, Sep. 2000.

Sharma, S. et al., Feature Extraction Using Non-Linear Transformation for Robust Speech Recognition on the Aurora Database, IEEE, 1117-1120, 2000.

Pols, L., Flexible, Robust, and Efficient Human Speech Recognition, Institute of Phonetic Sciences, Proceedings 21, 1-10, 1997.

Bourlard, H. et al., Towwards Increasing Speech Recognition Error Rates, Speech Communication 18, 205-231, 1996.

Kingsbury, B., Perceptually Inspired Signal-processing Strategies for Robust Speech Recognition in Reverberant Environments, dissertation, University of California Berkeley, 1998.

Sharma, S., Multi-Stream Approach to Robust Speech Recognition, dissertation, Oregon Graduate Institute of Science and Technology, 1999.

* cited by examiner

WEB-BASED SPEECH RECOGNITION WITH SCRIPTING AND SEMANTIC OBJECTS

CROSS REFERENCES TO RELATED APPLICATIONS

This application claims the benefit of priority from commonly owned U.S. Provisional Patent Application Ser. No. 60/192,091, filed Mar. 24 2000, entitled COMBINED SYNTACTIC AND SEMANTIC SEARCH, PARSING, AND APPLICATION ACCESS; U.S. Provisional Patent Application Ser. No. 60/191,915, filed Mar. 24 2000, entitled SPEECH RECOGNITION APPLICATION TECHNOLOGY USING WEB, SCRIPTING AND SEMANTIC OBJECTS; U.S. Provisional Patent Application Ser. No. 60/192,090, filed Mar. 24 2000, entitled A NOVEL APPROACH TO SPEECH RECOGNITION; and U.S. Provisional Patent Application Ser. No. 60/192,076, filed Mar. 24 2000, entitled REMOTE SERVER OBJECT ARCHITECTURE FOR SPEECH RECOGNITION, all of said provisional applications, now expired.

This application is also related to the following co-pending U.S. patent applications, the contents of which are incorporated herein in their entirety by reference:

"A NOVEL APPROACH TO SPEECH RECOGNITION", U.S. patent application Ser. No. 09/815,768, now U.S. Pat. No. 6,868,380 having issued on Mar. 15, 2005;

"PHONETIC DATA PROCESSING SYSTEM AND METHOD", U.S. patent application Ser. No. 09/815,769, now U.S. Pat. No. 6,895,377 having issued on May 17, 2005; and "REMOTE SERVER OBJECT ARCHITECTURE FOR SPEECH RECOGNITION", U.S. patent application Ser. No. 09/8815,808, now U.S. Pat. No. 7,120,585 having issued on Oct. 10, 2006.

FIELD OF THE INVENTION

The present invention generally relates to systems and methods for developing and implementing transactional speech applications. More specifically, the present invention relates to systems and methods for developing and implementing transactional speech applications using Web-based technologies.

BACKGROUND OF THE INVENTION

With the proliferation of computer systems, an increasing amount of processing is becoming automated. At the same time, the processing power of such systems continues to evolve. To make use of this increasingly available processing capability, organizations are attempting to migrate functions historically performed by individuals, if at all, to automated systems. For instance, increasingly, computer systems are developed and used to engage humans via speech interaction. Some systems, as an example, are implemented to conduct interviews or surveys of individuals via a telephone, while other systems may interact with individuals without the use of a network. Additionally, as speech over the World Wide Web (the "Web") and the Internet (e.g., voice over IP) becomes more and more commonplace, one can assume that human—computer speech based interaction will be increasingly conducted using that medium.

One typical example of human—computer speech based interaction is survey systems, wherein a computer conducts an automated speech based survey of an individual over a telephone. In such a case, the survey system may have a scripted survey (i.e., series of questions) to be asked of the individual. The survey system may ask a first question, as a prompt, and await (e.g., for 5 seconds) a response by the individual. If the survey system does not receive a response, or receives a response that it can not interpret, the survey system may ask the question again or provide an instructional type of feedback. If the survey system receives a response that it can interpret, the survey system goes on to ask a next question or present a next prompt.

Such human—computer systems usually include an automatic speech recognition (ASR) system that converts incoming acoustic information into useful linguistic units, such as words or phrases. In a transactional ASR, for example one operating over a telephone network, there are a set of allowed words and phrases, which are defined by grammars. The process of sorting through the grammars for a particular word or phrase usage is referred to as syntactic search, wherein the words and their order are determined, typically based on probability. Such syntactic search subsystems typically evaluate a word using a fixed start point and a fixed end point, and process that data to determine the word with a related probability. However, this approach tends to be inefficient since the timeframe between start and end points may be adequate for some audio inputs, but inadequate for others, where some data beyond an endpoint may be cutoff and in other cases more time may be spent on a word than is required. Additionally, if not yielding results above a certain threshold probability, such systems may backtrack and continue to process the audio input to improve the phonetic estimates. Otherwise, the system may just put forth a best guess, albeit with low confidence.

In such systems, typically audio inputs, whether speech or background noise, are processed as valid speech, for the most part. That is, such systems do not usually maintain sufficient contextual knowledge about the expected response to eliminate extraneous noises (or "barge in"). As a result, such systems may attempt to interpret such noises as speech, thereby producing a result having embedded errors or rejecting the result altogether.

Development of speech applications that utilize speech recognition (SR) systems, to create such human—computer systems, is generally an expensive, time-consuming effort that requires a multi-disciplinary team. The dominant approach to improving the ease of such application development has been to create Web-based applications using HTML extensions. For example VOXML, VoiceXML, and SpeechML are known types of extensions created specifically for SR systems. However, these approaches have been seriously limited in their ability to represent complex speech interactions, due to strong limitations in their coding power, as well as limitations on their control of, and access to, the underlying SR engines. That is, HTML is not a true programming language, but is rather a markup language. Therefore, it only provides a very limited framework, which is not particularly conducive to creating robust applications. Access to the speech recognition engines by such VoiceXML applications is limited by the bottlenecks of markup languages, such as the lack of programming language facilities, and fixed, predefined interfaces to the SR engine.

Such VoiceXML applications typically reside with a SR system on a voice portal (or gateway) that acts as a client to a Web server that provides back-end services to the VoiceXML application. The back-end services include standard Web services and, usually, custom software required by the VoiceXML application. For example, a back-end (i.e., server-side) product data servlet is typically included that is responsible for talking to back-end services, including converting received replies into XML. A product presentation servlet is typically also included at the server-side. This servlet is used to put content in a format required by the VoiceXML application (or client). A repository of VoiceXML specific XSL templates resides at the back-end and defines the formats used by the product presentation servlet. A product service is also provided at the back-end that manages the dissemination of product-related information, for example, to facilitate product browsing. And, a product database used by the various server-side servlets and services also resides at the back-end.

This approach of a strong reliance on back-end, server-side services is required with such VoiceXML applications, since VoiceXML applications are not, themselves, capable of delivering complex and robust functions.

SUMMARY OF THE INVENTION

The present invention is a system and method for creating and implementing transactional speech applications (SAs) using Web technologies, without reliance on server-side standard or custom services. A transactional speech application may be any application that requires interpretation of speech in conjunction with a speech recognition (SR) system, such as, for example, consumer survey applications or systems. A speech application in accordance with the present invention is represented within a Web page, as an application script that interprets semantic objects according to a context. Any commonly known scripting language can be used to write the application script, such as Jscript, PerlScript, and VBscript. The present invention is "Web-based" to the extent that it implements Web technologies, but it need not include or access the World Wide Web.

A SR system includes a SR platform and SR application program. The SR system serves as an interface or gateway between a user accessible network and an application system (i.e., source) that generates the Web page that includes the application script. The application script source may be local or remote to the SR system. If the SR system is to access a remote application system, the SR system includes page address information (e.g., URLs) and may be configured to access the application system and download the Web page in response to an incoming call.

The SR platform may be, for example, a standard server having a network interface that facilitates receipt of audio information. The network interface may facilitate reception of audio information by any of a variety of a networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The SR system may be accessible by any one or more of a variety of devices capable of communicating audio information, such as telephone, cellular telephone, personal computer (PC), personal digital assistant (PDA) or other types of audio enabled devices.

The Web page, including the application script, may reside at the SR system, local to it, or may be downloaded from a transactional speech application system via a network, such as the networks described above. The functionality of the speech application is delivered to the SR system from the application script without the need for server-side application coding at an application server, as is necessary in systems using speech applications written in VoiceXML, for example. That is, all required application functionality may be downloaded, if necessary, and executed at the SR system. Such functionality includes presenting user prompts, processing user responses, overall application session management, interfacing with other available modules or facilities that provide functionality. Such functionality also includes SR system control functionality and standard HTML and operating system functionality. Interfaces to such functionality are preferably written as standalone, reusable objects.

Generally, all of the interface objects used by the application script conform to a standard interface model, such as ActiveX. The application script can easily access all of the inherent ActiveX capabilities of the operating system (e.g., messaging, database access, etc.) via these standard interfaces using standard ActiveX controls. Using ActiveX interface objects (i.e., standard, consistent objects) for accessing and controlling functions available to the application script greatly eases the development and integration of such applications, which need only be configured to use these standard ActiveX interface objects, so do not require special or custom interfaces. The ActiveX objects are local to the SR system and can be used with any application script presented or downloaded.

A semantic interface to the SR application exposes the application script to the SR system. The semantic interface is written as an object that is local to the SR system, such as an ActiveX object. The semantic interface object includes standard HTML browser functionality, including tag processing, hyper references, and so forth. The semantic interface object also supports HTML extensions, such as Dialog, Play, and Record, as well as other known HTML extensions. If there are script tags residing on the Web page, the semantic interface loads a corresponding script engine. Since the semantic interface is coded as a high-level object interface, it need not be customized for the application script. Through the semantic interface object, the application script controls the SR system. For example, the application script can task the SR application to begin recognition, play back a file, play a prompt, and so on. Such tasking may be accomplished using standard object oriented design (OOD) calls and methods.

The SR application functionality is configured to produce and return a context free set of semantic data representing all possible valid interpretations of a received audio input. That is, the SR system may be configured to perform syntactic and semantic processing using a common, root grammar or set of grammars to produce a semantic data representing a plurality of valid interpretations of a received audio input. The semantic data is represented in a semantic object (or objects) passed from the SR application to the application script. Each semantic object passes through the semantic interface to an evaluation interface of the application script. The evaluation interface can also be wriUen as an ActiveX object, which may serve as an evaluation (or interpretation) tool to the application script. The application script provides a context to the evaluation interface. The evaluation interface determines a category as a function of the context and applies the category to the set of semantic data to obtain a specific interpretation of the set of semantic data, from all of the possible interpretations. This specific result may be referred to as a linguistic result, representing a word, phrase, or values. Once the linguistic result is determined, the application script processes the result to determine its next action or prompt for the user.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

The present invention is a system and method for creating and implementing transactional speech applications (SAs) using Web technologies, without reliance on server-side standard or custom services. A transactional speech application may be any application that requires interpretation of speech in conjunction with a speech recognition (SR) system, such as, for example, consumer survey applications or systems. A speech application in accordance with the present invention is represented within a Web page, as an application script that interprets semantic objects according to a context. Any commonly known scripting language can be used to write the application script, such as Jscript, PerlScript, and VBscript. The present invention is "Web-based" to the extent that it implements Web technologies, but it need not include or access the World Wide Web.

Figure 1:
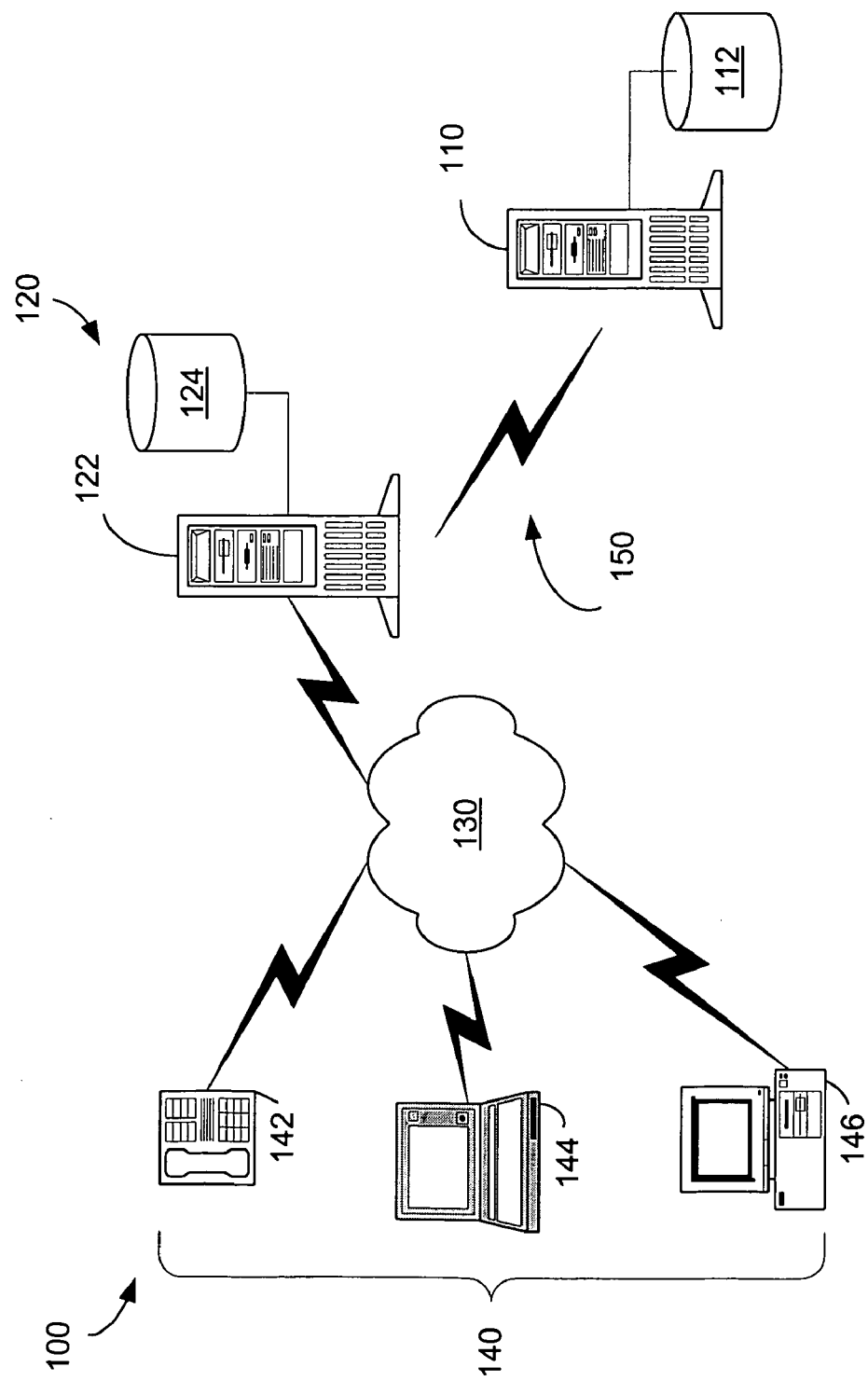
FIG. 1 is a network architecture within which the present invention may be implemented.

The present invention may be implemented on any one or more of a variety of devices, networks, and architectures. FIG. 1 shows one possible architecture 100 on which the present invention may be implemented. A SR system 120 includes a SR application program hosted on a standard platform, such as SR server 122. One or more associated databases 124 includes the SR application and data, such as context free grammar databases. The SR system serves as an interface or gateway between a user accessible network 130 and an application system (i.e., source) that generates the Web page that includes the application script. The application source may be local or remote to the SR system. In fact, the application script source may also be hosted on server 122. In other embodiments, application code may be hosted on an application server 110, having an associated database (DB) 112, that is coupled to the SR system via any one of a variety of standard networks 150. In yet other embodiments, the SR system may service a variety of application sources, some of which may be local and others may be remote to the SR system. If the SR system is to access a remote application system, the SR system includes page address information (e.g., URLs) and may be configured to access the application system and download the Web page in response to an incoming call.

The SR system 120 may include a network interface that facilitates receipt of audio information by any of a variety of a networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The SR system may be accessible by any one or more of a variety of devices 140 capable of communicating audio information. Such devices 140 may include, but are not limited to, a standard telephone (including cellular telephones) 142, a laptop computer 144, or a desktop computer 146, as well as other audio enabled devices (e.g., personal digital assistants, audio receivers, and application servers).

A speech application may be any interactive application that collects, provides, and/or shares information. As examples, in the present invention, a speech application and application script may be any of a group of interactive applications, including consumer survey applications; Web access applications; educational applications, including health education applications and computer-based lesson applications and testing applications; screening applications, including patient screening applications and consumer screening applications; health risk assessment applications; monitoring applications, including heath data monitoring applications and consumer preference monitoring applications; compliance applications, including applications that generate notifications of compliance related activities, including notifications regarding health or product maintenance; test results applications, including applications that provide at least one of lab test results, standardized tests results, consumer product test results, and maintenance results; and linking applications, including applications that link two or more of the above applications.

Figure 2:
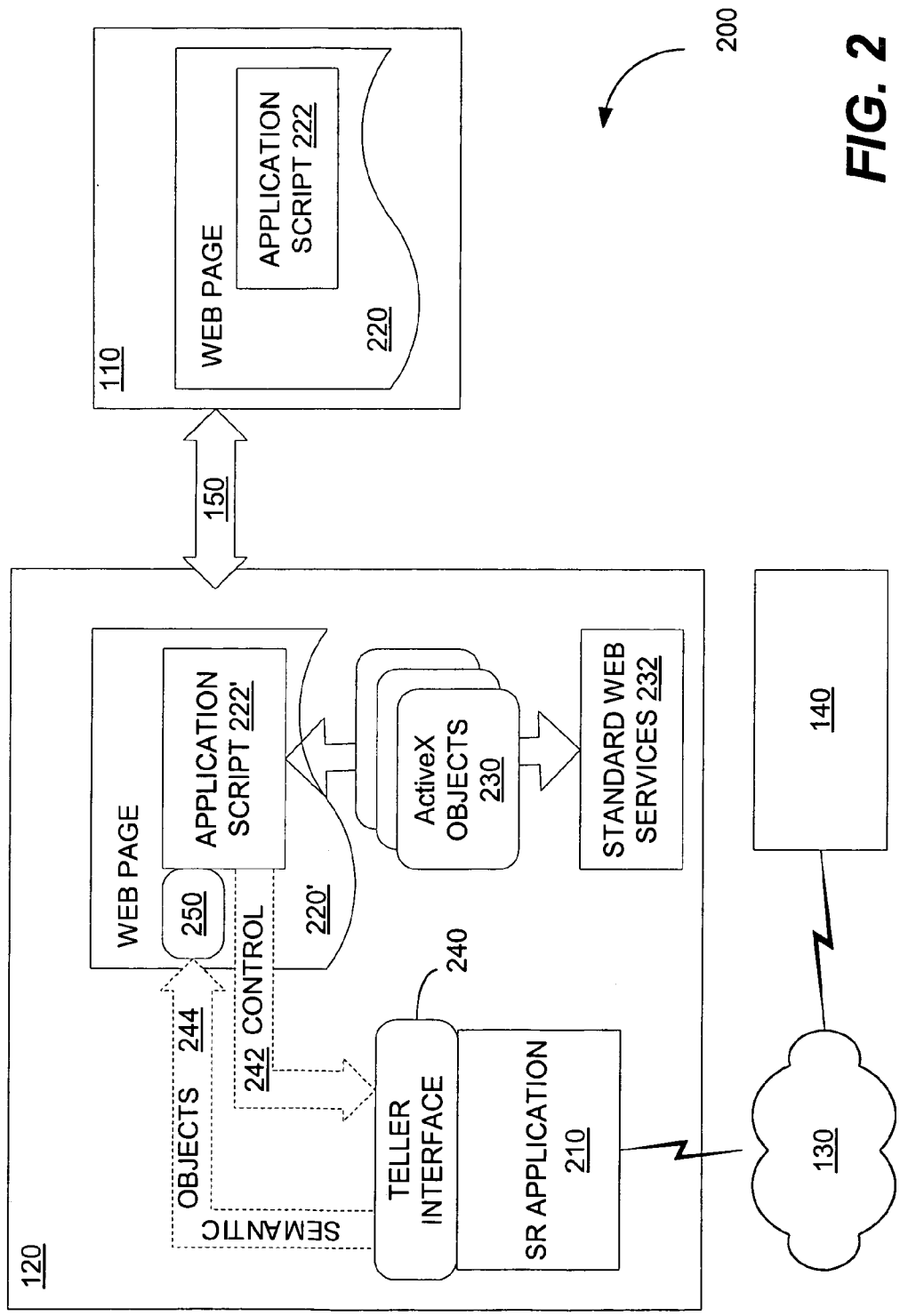
FIG. 2 is a block diagram depicting the various elements of an implementation of a speech application and speech recognition system in accordance with the present invention.

Referring to FIG. 2, a block diagram 200 showing an implementation of the present invention is shown. The Web page 220, including the application script 222, may reside local to the SR system or may be downloaded from a transactional speech application system 110 via network 150. In any event, Web page 220 is loaded on SR system 120 (or a platform local to it), represented as Web page 220' with application script 222'. The functionality of the speech application is delivered to the SR system 120 from the application script 222' without the need for server-side application coding at an application server 110, as is necessary in systems using speech applications written in VoiceXML, for example. That is, all required application functionality is downloaded as part of the application script and executed with the SR system 120. Such functionality includes presenting user prompts, processing user responses, overall application session management, and interfacing with other available modules or facilities that provide functionality. Such prompts may include questions, like "Have you ever been to Aruba?" User responses include, for example, answers to such questions, e.g., "Hundred times!" Overall session management may include administering a survey that presents such prompts and processes such responses. Such functionality also includes functionality to control SR system 120 and standard HTML and operating system functionality. Interfaces to such functionality are preferably written as standalone, reusable objects.

In the preferred embodiment, all of the interface objects used by application script 222' conform to a standard interface model, such as ActiveX. That is, ActiveX objects 230 provide the application script 222' access to standard Web services. Therefore, application script 222' can easily access all of the inherent ActiveX capabilities of the operating system (e.g., messaging, database access, etc.) via these standard interfaces 230 using standard ActiveX controls. Using ActiveX interface objects 23 (i.e., standard, consistent objects) for accessing and controlling functions available to the application script 222' greatly eases the development and integration of such applications. Speech application in accordance with the present invention need only be configured to use these standard ActiveX interface objects 230, so do not require special or custom interfaces. The ActiveX objects 230 are local to the SR system and can be used with any application script presented to or loaded thereon.

A semantic interface, referred to as the "Teller" interface 240, exposes the application script 222' to the SR application 210. The Teller interface is written as an ActiveX object that is local to the SR system 210. The Teller interface object 210 includes standard HTML browser functionality, including tag processing, hyper references, and so forth. The Teller interface object 240 also supports HTML extensions, such as Dialog, Play, and Record, as well as other known HTML extensions. If there are script tags residing on the Web page, the Teller interface object 240 loads a corresponding script engine.

Since the Teller interface is coded as a high-level object interface, it need not be customized for the application script 222'. Rather, many instances of the Teller interface object 240 can be created, each serving one of a variety of application scripts. An instance of the Teller interface object 240 can be created in advance or upon an incoming call from device 140. Through the Teller interface object 240, application script 222' controls the SR application 210, represented as arrow 242. For example, the application script can task the SR application to begin recognition, play back a file, play a prompt, and so on. Such tasking may be accomplished using standard object oriented design (OOD) calls and methods.

Teller interface object 240 can be further appreciated with respect to the following pseudo code segment:

```
// Transaction Parameters
    void SetTimeout(int time);
    void SetBargeIn(boolean b);
    void SetListenRatio(float confidence);
// Transaction Methods
    ResultInterface Play(String file);
    ResultInterface Say(String sentence);
    ResultInterface Listen(String semanticObjectClass);
    boolean Hangup();
```

The SR application 210 functionality is configured to produce and return a context free set of semantic data representing all possible valid interpretations of a received audio input. The SR system may be of the form described in commonly owned, co-pending application having the U.S. patent application Ser. 09/815,769, incorporated herein by reference. That is, the SR system 120 may be configured to perform syntactic and semantic processing using a common, root grammar or set of grammars to produce a semantic tree instance representing all possible valid interpretations of a received audio stream. The semantic data is represented in a semantic object (or objects) 244 passed from the SR application 210 to the application script 222'. Each semantic object 244 passes through the Teller interface 240 to an evaluation interface 250 of the application script.

The evaluation interface 250 can also be written as an ActiveX object, which may serve as an evaluation (or interpretation) tool to the application script 222'. The application script 222' provides a context to the evaluation interface 250. The evaluation interface 250 determines a category associated with the context and applies the category to the semantic objects 244 to obtain a specific interpretation of the set of semantic data, from all of the possible interpretations. This specific result may be referred to as a linguistic result, representing a word, phrase, or values. Once the linguistic result is determined, the application script 222' processes the result to determine its next action or prompt for the user. The evaluation interface 250 may be further appreciated with the following pseudo code segment.

```
ResultInterface {
    String asCategory(String category);
}
```

Categories are identified by their names. They specify the particular semantic interpretation required. Note that a semantic object 244 may be capable of interpretation using any one of multiple valid categories. These categories control different semantic interpretations of the semantic object, depending on context. Collectively, the categories describe all possible valid interpretations of the semantic object. Because all contexts are represented, this allows the semantic object to be used and re-used in a context-independent manner. Examples of Categories are: "number", "string", "digits", "car-model".

Figure 3:
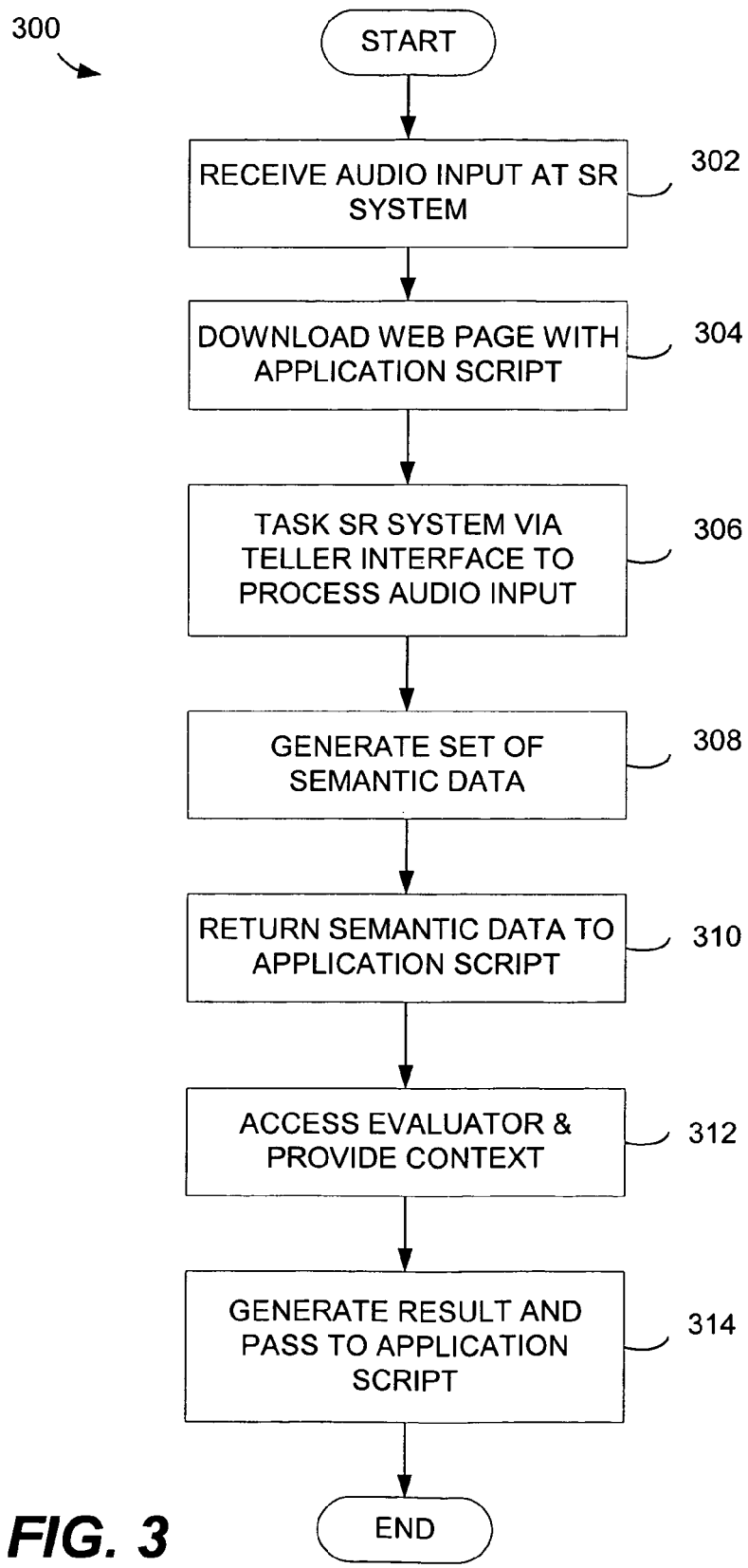
FIG. 3 is a flow chart depicting a method of the present invention.

FIG. 3 provides a flowchart that may be implemented by the applications and objects for FIG. 2 by a transactional speech application in accordance with the present invention. The process begins, for example, with receipt of an audio input by device 140 via network 130. This audio input is received by the SR system in step 302. If the application script 222' has not already been downloaded to SR system 120, the application script 222' is downloaded from a source in step 304. With receipt of an audio input, the application script 222' tasks the SR system via controls 242 to, for example, interpret the audio input, in step 306.

By interpreting the audio input, the SR application 210 generates a context free semantic tree instance representing all possible valid interpretations of the audio input, which is represented as one or more semantic objects 244, in step 308. In step 310, the SR application 210 passes the semantic object(s) 244 to the application object 222' via the Teller interface 240. The Teller interface does not perform any substantive processing of the semantic object(s) 244. Rather, a semantic tree evaluator 250 receives the semantic tree instance and a context dictated by the application script, in step 312. Evaluator 250 may be provided with the context by the application script 222' prior to receipt of the semantic tree instance, embodied in semantic object 244. The semantic tree instance may be directly received from the SR application 210 or it may be passed through the application script 222', depending on the embodiment.

In the preferred form, the semantic tree evaluator 250, in step 314, determines a category to be applied at each node of the semantic tree instance. Since the semantic tree instance is received from the SR application 210 as context free and representing all valid interpretations of the audio input, application of the context and a corresponding category at each node is necessary to achieve a single, correct linguistic result. This result serves as a response to a pending prompt by the application script 222'. Accordingly, also in step 314, the linguistic result is passed to application script 222'. Application script 222' determines its next action, e.g., send another prompt, as a function of the linguistic result.

As the session is conducted, the application script 222' need not access back-end servers for any reason. When the session is finished, for example, if a survey being administered by application script 222' is complete, the application script 222' may be deleted. The ActiveX objects remain resident at the SR system and may be reused by other application scripts downloaded to the SR system.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A speech application system, comprising:
   A. a speech recognition (SR) configured to receive an audio input and generate a context-independent result object representing all possible context-dependent interpretations of said audio input;
   B. a speech application script, loaded at the SR system and configured to control said SR system, said application script defining one or more application contexts, said application contexts being represented as categories of interpretation, wherein said application script includes programming code written in a language chosen from a group of scripting languages comprising Jscript, PerlScript, or VBscript; and
   C. a result object evaluator, configured to receive said context-independent result object and said one or more application contexts and, as a function thereof, to generate a specific interpretation result corresponding to said audio input, and to return said interpretation result to said application script.

2. A system as in claim 1, wherein one or more of said application script is included in a Web page.

3. A system as in claim 1, wherein said audio input is received from a device chosen from a group comprising:
   A. a telephone;
   B. a cellular telephone;
   C. a personal computer;
   D. an application server; and
   E. an audio receiver.

4. A system as in claim 1, wherein said audio input is received via a network including one or more wire or wireless networks from a group, comprising:
   A. a telephone network;
   B. a cellular telephone network;
   C. a LAN;
   D. a WAN;
   E. a virtual private network;
   F. the Internet; and
   G. the Web.

5. A system as in claim 1, wherein said plurality of valid interpretations of said audio input includes all valid interpretations of said audio input within said context.

6. A system as in claim 1, wherein speech application is chosen from a group of interactive speech applications comprising:
   A. consumer survey applications;
   B. Web access applications;
   C. educational applications, including health education applications and computer-based lesson applications and testing applications;
   D. screening applications, including patient screening applications and consumer screening applications;
   E. health risk assessment applications;
   F. monitoring applications, including heath data monitoring applications and consumer preference monitoring applications;
   G. compliance applications, including applications that generate notifications of compliance related activities, including notifications regarding health or product maintenance;
   H. test results applications, including applications that provide at least one of lab test results, standardized tests results, consumer product test results, and maintenance results; and
   I. linking applications, including applications that link two or more of the applications in parts A through H.

7. A system according to claim 1, further including a set of reusable object oriented interfaces local to the SR system, said interfaces configured to interface said application script with said SR system.

8. A system as in claim 7, wherein one or more of said interfaces are objects exposed via ActiveX facilities.

9. A method of speech recognition (SR), comprising the steps of:
   A. receiving an audio input with a SR system and generating a context-independent result object representing all possible context-dependent interpretations of said audio input;
   B defining one or more application contexts with an application script, said application contexts being represented as categories of interpretation, said application script defining one or more application contexts, said application contexts being represented as categories of interpretation, wherein said application script includes programming code written in a language chosen from a group of scripting languages comprising Jscript, PerlScript, or VBscript; and
   C. receiving said context-independent result object and said one or more application contexts and, as a function thereof, generating a specific interpretation result corresponding to said audio input, and to return said interpretation result to said application script.

10. A method according to claim 9, further including interfacing said application script with the SR system via a set of reusable object oriented interfaces local to the SR system.

* * * * *